United States Patent
Richards et al.

(10) Patent No.: US 9,966,629 B2
(45) Date of Patent: May 8, 2018

(54) SODIUM-CONDUCTING SOLID ELECTROLYTE

(71) Applicants: Samsung Electronics, Co. Ltd., Suwon-si, Gyeonggi-Do (KR); Massachusetts Institute of Technology, Cambridge, MA (US)

(72) Inventors: William D. Richards, Cambridge, MA (US); Shyue Ping Ong, San Diego, CA (US); Yifei Mo, Greenbelt, MD (US); Gerbrand Ceder, Wellesley, MA (US); Lincoln Miara, Cambridge, MA (US); Tomoyuki Tsujimura, Yokohama (JP); Yan Wang, Cambridge, MA (US); Young-Gyoon Ryu, Lexington, MA (US); Naoki Suzuki, Ibaraki (JP); Ichiro Uechi, Toyonaka (JP)

(73) Assignees: SAMSUNG ELECTRONICS CO., LTD., Gyeonggi-Do (KR); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 363 days.

(21) Appl. No.: 14/698,691

(22) Filed: Apr. 28, 2015

(65) Prior Publication Data
US 2016/0226095 A1  Aug. 4, 2016

Related U.S. Application Data

(60) Provisional application No. 62/111,536, filed on Feb. 3, 2015.

(51) Int. Cl.
*H01M 10/39* (2006.01)
*H01M 10/0562* (2010.01)
(Continued)

(52) U.S. Cl.
CPC ......... *H01M 10/0562* (2013.01); *C01B 25/14* (2013.01); *H01M 4/381* (2013.01);
(Continued)

(58) Field of Classification Search
CPC ..................................................... H01M 10/39
See application file for complete search history.

(56) References Cited

U.S. PATENT DOCUMENTS 6,706,851 B1  3/2004  Linemann et al.
8,697,292 B2  4/2014  Kanno et al.
(Continued)

FOREIGN PATENT DOCUMENTS

JP   201428717 A    2/2014
KR   1020140051853 A  5/2014
KR   1020140094676 A  7/2014

OTHER PUBLICATIONS

Hueso, Karina, et al., "High temperature sodium batteries: status, challenges and future trends," Energy & Environmental Science, 2013, vol. 6, pp. 734-749.
(Continued)

*Primary Examiner* — Jacob Marks
(74) *Attorney, Agent, or Firm* — Cantor Colburn LLP (57) ABSTRACT

A sodium-conductive solid-state electrolyte material includes a compound of the composition $Na_{10}MP_2S_{12}$, wherein M is selected from Ge, Si, and Sn. The material may have a conductivity of at least $1.0 \times 10^{-5}$ S/cm at a temperature of about 300K and may have a tetragonal microstructure, e.g., a skewed P1 crystallographic structure. Also provided are an electrochemical cell that includes the sodium-conductive solid-state electrolyte material and a method for producing the sodium-conductive solid electrolyte material via controlled thermal processing parameters.

22 Claims, 6 Drawing Sheets

(51) Int. Cl.
  *C01B 25/14* (2006.01)
  *H01M 4/38* (2006.01)
  *H01M 10/05* (2010.01)
(52) U.S. Cl.
  CPC ......... *H01M 10/05* (2013.01); *C01P 2002/30* (2013.01); *C01P 2002/72* (2013.01); *C01P 2006/40* (2013.01); *H01M 2300/0068* (2013.01)

(56) References Cited

U.S. PATENT DOCUMENTS

| | | | |
|---|---|---|---|
| 9,634,360 | B2 | 4/2017 | Hayashi et al. |
| 9,761,869 | B2 | 9/2017 | Kawakami et al. |
| 2010/0248001 | A1 | 9/2010 | Kuze et al. |
| 2010/0266900 | A1 | 10/2010 | Makidera et al. |
| 2010/0273062 | A1 | 10/2010 | Tsuchida et al. |
| 2010/0323231 | A1 | 12/2010 | Sakai et al. |
| 2011/0168327 | A1 | 7/2011 | Oladeji |
| 2011/0171398 | A1 | 7/2011 | Oladeji |
| 2011/0171528 | A1 | 7/2011 | Oladeji |
| 2012/0094185 | A1 | 4/2012 | Tsuchida et al. |
| 2012/0199785 | A1 | 8/2012 | Saka |
| 2012/0258359 | A1 | 10/2012 | Saka |
| 2012/0276438 | A1* | 11/2012 | Saka ............ C01B 25/45 429/144 |
| 2012/0317797 | A1 | 12/2012 | Oladeji |
| 2013/0040208 | A1 | 2/2013 | Kanno et al. |
| 2013/0224588 | A1 | 8/2013 | Kageura |
| 2013/0323590 | A1 | 12/2013 | Kageura |
| 2014/0065492 | A1 | 3/2014 | Komaba et al. |

OTHER PUBLICATIONS

Ong, Shyue Ping, et al., "Phase stability, electrochemical stability and ionic conductivity of the Li10+/−MP2X12 (M =Ge, Si, Sn, Al or P, and X =O, S or Se) family of superionic conductors," Energy & Environmental Science, 2013, vol. 6, pp. 148-156.

* cited by examiner

SODIUM-CONDUCTING SOLID ELECTROLYTE

TECHNICAL FIELD

Provided generally are sodium-conducting solid electrolytes that may be used in electrochemical cells. The electrolytes exhibit a high conductivity at room temperature.

BACKGROUND

Electrochemical cells such those found in lithium ion batteries are known to provide high energy densities and specific energies of any battery chemistry. Hence they represent promising candidates for mobile and stationary energy storage applications. However, safety problems arise in such cells from the presence of volatile organic solvents. Thus, there is a need to use inorganic, solid-state electrolytes that exhibit high conductivity to eliminate the problems caused by liquid electrolyte systems.

A number of publications, patent applications, and patents describe advances in solid electrolyte materials for lithium ion cells. However, known sodium batteries are incapable of operating at room temperature because there is no known electrolyte of a sufficiently high conductivity at room temperature for sodium ion transport.

Thus, opportunities exist to provide a sodium-conducting solid electrolyte having sufficiently high conductivity for use in a room-temperature solid-state sodium electrochemical cell.

SUMMARY

In a first embodiment, a Na-conductive solid-state electrolyte material. The material comprises a compound of the composition $Na_{10}MP_2S_{12}$, wherein M is selected from Ge, Si, and Sn. The material may have a conductivity of at least $1.0 \times 10^{-5}$ S/cm at a temperature of 300K.

The material may have a tetragonal structure, e.g., a skewed P1 structure. When exposed to CuKα radiation, diffraction peaks may be formed in positions of within 0.50° of 2θ=18.18°, 26.74°, 33.88°, 36.90°, 38.07°, 42.59°, and/or 46.10° as measured by X-ray diffraction using CuKα radiation.

In another embodiment, an electrochemical cell is provided. The cell comprises an anode layer containing an anode material, a cathode layer containing a cathode material, and an electrolyte layer between the anode and cathode layers. A solid-state, Na-conductive material as described above is present in the cathode layer and/or the electrolyte layer. Preferably, the Na-conductive material consists essentially of $Na_{10}MP_2S_{12}$ of appropriate microstructure. The cell may, for example, be a rechargeable solid-state cell.

In a further embodiment, a method is provided for producing a sodium-conductive solid electrolyte material. The method involves combining a plurality of compounds to form a raw material composition. The raw material composition includes elements Na, P, S, and M, wherein element M may be selected from Ge, Si, and Sn. The raw material composition is heated to temperature effective to form a solid-state solution via elemental diffusion and cooling the solid-state solution at a rate no greater than about 1° C. per minute to produce the electrolyte material. As a result, the electrolyte material exhibits a conductivity of at least $1.0 \times 10^{-4}$ S/cm at a temperature at about 300K.

Other embodiments of the invention will be apparent to those of ordinary skill in the art in view of the disclosure contained herein.

DESCRIPTION

Overview and Definitions

Provided are a number of new solid-state materials that exhibit high sodium ion conductivity at room temperature, e.g., at about 300K. Materials in accord with an embodiment have applicability in room temperature sodium based energy storage devices. Given that lithium has a smaller atomic radius than sodium, sodium may be safer than lithium in electrochemical cells. As sodium is more abundant than lithium on Earth, sodium electrochemical cells may replace conventional Li-ion batteries in high-technology or automotive applications. No other room temperature Na-ion conductors have been found with as high conductivity as these materials. For example, the materials of the invention may exhibit room-temperature conductivities greater than those associated with conventional sodium super ionic conductors (NASICON) and beta-alumina solid electrolytes.

The new materials are somewhat similar to Li-conductive materials, e.g., materials that include Li, Ge, P, S. In the present case, however, Na may be used in place of Li of $Li_{10}GeP_2S_{12}$. In addition, Si or Sn may take the place of Ge.

Advantageously, the new materials exhibit high room temperature conductivity. In particular, the Ge-containing material may exhibit the highest conductivity. In addition, the new materials can be produced using relatively simple manufacturing process. Because the new materials are produced via different processing route, their crystal structure is different from those of prior art materials.

More generally, the new solid-state materials of the invention exhibit similarity to those used in all-solid-state lithium rechargeable batteries, and high temperature sodium batteries. Lithium batteries exist in commercial form for very low power applications such as for "powering up" semiconductor devices. This configuration is used since it provides excellent cycle life. The high temperature sodium batteries are used for grid storage and train locomotive power.

Before describing the invention in detail, numerous electrochemical cell configurations may be used to form embodiments described herein described herein. However, there are numerous differences between embodiments described herein and known Li-battery technologies.

In this specification and in the claims that follow, reference is made to a number of terms that are defined to have the following meanings, unless the context in which they are employed clearly indicates otherwise:

The terms "electronic," "electronically," and the like are used in their ordinary sense and relate to structures, e.g., semiconductor microstructures, that provide controlled conduction of electrons, holes, or other charge carriers.

The term "electrolyte" as in "solid-state electrolyte" is used herein to refer a material through which ions may, under an electric potential gradient, migrate by means of vacancies or interstitials within the material. Typically, an electrolyte exhibits high ionic conductivity and low electronic conductivity.

The term "spinel" is used herein in its ordinary crystallographic sense and refers to a crystalline structure of the general formula $AB_2C_4$ wherein anions C are arranged in a close-packed cubic and cations A and B occupy some or all of the octahedral and tetrahedral sites in the lattice. The spinel structure is recognized as capable of providing good three-dimensional ion conduction.

As a related matter, "tetragonal" is also used herein in its ordinary crystallographic sense and refers to a crystal lattice that would result from stretching a cubic lattice along one of its lattice vectors, so that the cube becomes a rectangular prism with a square base, defined by sides a, and height, c ($a \neq c$).

Similarly, the terms "substantial" and "substantially" are used in their ordinary sense and mean "of considerable importance" or "to a great or significant extent," but that trivial or insignificant counterexamples may be found. For example, a "substantially tetragonal" crystallographic unit cell may exhibit unit-cell angles $\alpha$, $\beta$, and $\gamma$ that are each within a few degrees from 90°. Similarly, a "substantially solid-state" battery is to be interpreted to mean a battery comprising entirely or consisting essentially of solid components, but that the battery does not have to exclude components that are entirely devoid of fluids as long as the operation of the battery is not hindered.

The term "solution" is used in its chemical sense and refers to one or more solutes in a solvent. A solution may be fluid or solid in nature. For example, a solid-state solution differs from a solid-state compound in that the crystal structure of the solvent remains unchanged by addition of the solutes and that the solution may remain in a single homogeneous phase.

Solid Sulfide Electrolyte Materials

Figure 1:
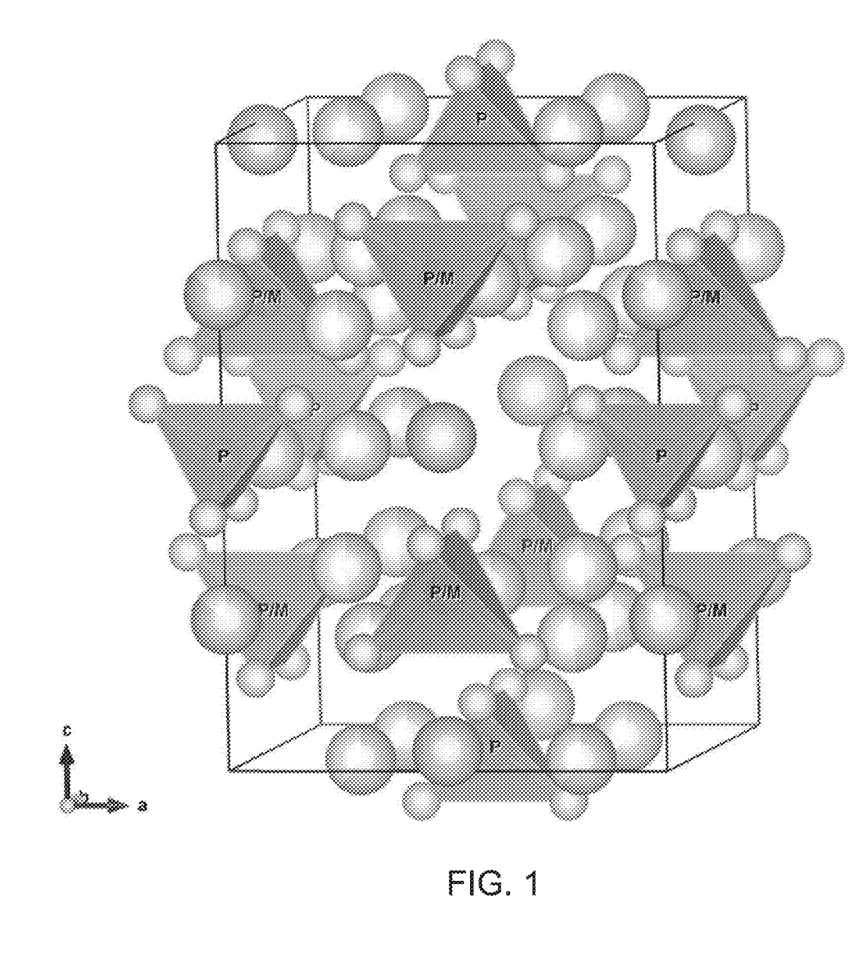
FIG. 1 depicts a crystallographic unit cell of an embodiment of a skewed P1 structure.

Solid sulfide electrolyte materials of the following compositions are described below—$Na_{10}GeP_2S_{12}$, $Na_{10}SnP_2S_{12}$, and $Na_{10}SiP_2S_{12}$. The compositions may exhibit a skewed P1 crystallographic structure as shown in FIG. 1. These novel materials may be used as the electrolyte in a solid-state sodium battery. The materials could also be used in other applications requiring high ionic conductivity of sodium ions and low electronic conductivity. Theoretical calculations pertaining to these materials, e.g., structures, phase stability, and conductivity, are carried out using techniques known in the art. Results of these calculations are set forth in Table I, where $E_{abovehull}$ sets forth a theoretical breakdown energy, i.e., a phase stability energy, associated with these materials, and $E_{activation}$ sets forth an theoretical energy associated with an absolute-zero temperature associated with ionic conductivity:

TABLE I

Various Theoretical Calculations

| | $Na_{10}GeP_2S_{12}$ | $Na_{10}SiP_2S_{12}$ | $Na_{10}SnP_2S_{12}$ |
|---|---|---|---|
| $E_{abovehull}$ (meV) | 7.2 | 13.6 | 7.1 |
| $E_{activation}$ (meV) | 247 | 220 | 329 |

TABLE I-continued

Various Theoretical Calculations

| | $Na_{10}GeP_2S_{12}$ | $Na_{10}SiP_2S_{12}$ | $Na_{10}SnP_2S_{12}$ |
|---|---|---|---|
| Conductivity @ 300K (mS/cm) | 3.3 | 5.9 | 0.62 |

The density functional theory (DFT) computed crystal structure for $Na_{10}GeP_2S_{12}$ has the following lattice parameters: a=9.429 angstroms, b=9.772 angstroms, c=14.035 angstroms, $\alpha$=93.924°, $\beta$=89.339°, $\gamma$=89.338°. Details pertaining to the calculated relative locations of the elements in the crystal structure are provided in Table II.

TABLE II

Theoretical Crystallographic Calculations for $Na_{10}GeP_2S_{12}$

| Element | a | b | c |
|---|---|---|---|
| Na | 0.9827 | 0.4892 | 0.9536 |
| Na | 0.9513 | 0.5462 | 0.4472 |
| Na | 0.5179 | 0.9756 | 0.5451 |
| Na | 0.4874 | 0.9988 | 0.0461 |
| Na | 0.3051 | 0.3225 | 0.1597 |
| Na | 0.7621 | 0.753 | 0.2727 |
| Na | 0.2065 | 0.809 | 0.7432 |
| Na | 0.2305 | 0.7593 | 0.2452 |
| Na | 0.774 | 0.2061 | 0.3528 |
| Na | 0.4694 | 0.5267 | 0.7345 |
| Na | 0.2115 | 0.2196 | 0.3651 |
| Na | 0.6897 | 0.2536 | 0.8649 |
| Na | 0.2239 | 0.7648 | 0.0056 |
| Na | 0.7422 | 0.2779 | 0.128 |
| Na | 0.766 | 0.7649 | 0.7354 |
| Na | 0.2591 | 0.2573 | 0.8976 |
| Na | 0.7472 | 0.7624 | 0.0169 |
| Na | 0.2621 | 0.7048 | 0.4743 |
| Na | 0.8026 | 0.2013 | 0.6381 |
| Na | 0.2159 | 0.2071 | 0.6424 |
| Ge | 0.0009 | 0.4836 | 0.1977 |
| Ge | 0.4941 | 0.9783 | 0.8033 |
| P | 0.9954 | 0.9577 | 0.5056 |
| P | 0.4925 | 0.5212 | 0.9793 |
| P | 0.0034 | 0.4881 | 0.7027 |
| P | 0.4887 | 0.0103 | 0.2966 |
| S | 0.9877 | 0.1622 | 0.474 |
| S | 0.0093 | 0.8195 | 0.388 |
| S | 0.3107 | 0.5348 | 0.9005 |
| S | 0.669 | 0.5409 | 0.8933 |
| S | 0.487 | 0.6665 | 0.0919 |
| S | 0.5045 | 0.3213 | 0.0234 |
| S | 0.1817 | 0.9384 | 0.5803 |
| S | 0.8177 | 0.9239 | 0.5828 |
| S | 0.0285 | 0.3058 | 0.0887 |
| S | 0.9921 | 0.6839 | 0.1223 |
| S | 0.1831 | 0.4917 | 0.6157 |
| S | 0.8229 | 0.4941 | 0.6228 |
| S | 0.4865 | 0.822 | 0.3536 |
| S | 0.4945 | 0.1662 | 0.4031 |
| S | 0.2964 | 0.9816 | 0.8969 |
| S | 0.6903 | 0.974 | 0.8934 |
| S | 0.0023 | 0.6516 | 0.8036 |
| S | 0.0043 | 0.3081 | 0.7749 |
| S | 0.798 | 0.4652 | 0.2807 |
| S | 0.1829 | 0.4875 | 0.3028 |
| S | 0.4972 | 0.1736 | 0.7226 |
| S | 0.4878 | 0.8019 | 0.6912 |
| S | 0.6692 | 0.0166 | 0.2098 |
| S | 0.3118 | 0.0369 | 0.2135 |

The DFT-computed crystal structure for $Na_{10}SiP_2S_{12}$ exhibits the following lattice parameters: a=9.646 angstroms, b=9.54 angstroms, c=14.035 angstroms, $\alpha$=93.924°, β=89.339°, γ=89.339°. Details pertaining to the calculated relative locations of the elements in the crystal structure are provided in Table III.

TABLE III

Theoretical Crystallographic Calculations for $Na_{10}SiP_2S_{12}$

| Element | a | b | c |
|---|---|---|---|
| Na | 0.2546 | 0.229 | 0.329 |
| Na | 0.7537 | 0.7678 | 0.3355 |
| Na | 0.2578 | 0.7285 | 0.8046 |
| Na | 0.744 | 0.2624 | 0.8157 |
| Na | 0.2618 | 0.7385 | 0.1896 |
| Na | 0.7317 | 0.2456 | 0.1986 |
| Na | 0.2411 | 0.2466 | 0.681 |
| Na | 0.7686 | 0.7541 | 0.6792 |
| Na | 0.0114 | 0.4981 | 0.9547 |
| Na | 0.0031 | 0.4898 | 0.4633 |
| Na | 0.513 | 0.9945 | 0.5368 |
| Na | 0.4973 | 0.9892 | 0.0445 |
| Na | 0.249 | 0.2411 | 0.0086 |
| Na | 0.7515 | 0.7478 | 0.0123 |
| Na | 0.2514 | 0.7445 | 0.4978 |
| Na | 0.7503 | 0.2524 | 0.4988 |
| Na | 0.0058 | 0.0006 | 0.2479 |
| Na | 0.5062 | 0.5 | 0.7425 |
| Na | 0.5123 | 0.5098 | 0.2497 |
| Na | 0.0046 | 0.9989 | 0.7557 |
| Ge | 0.0016 | 0.4978 | 0.7087 |
| Ge | 0.501 | 0.991 | 0.2887 |
| P | 0 | 0.4954 | 0.2043 |
| P | 0.5009 | 0.998 | 0.7942 |
| P | 0.0027 | 0.0008 | 0.502 |
| P | 0.4982 | 0.4952 | 0.9957 |
| S | 0.9976 | 0.1757 | 0.4114 |
| S | 0.0066 | 0.8251 | 0.4125 |
| S | 0.3269 | 0.4791 | 0.9053 |
| S | 0.6742 | 0.5089 | 0.9097 |
| S | 0.4949 | 0.6738 | 0.082 |
| S | 0.497 | 0.3235 | 0.089 |
| S | 0.1777 | 0.9953 | 0.5887 |
| S | 0.8289 | 0.0061 | 0.5906 |
| S | 0.9997 | 0.3156 | 0.1197 |
| S | 0.9997 | 0.6741 | 0.1182 |
| S | 0.1895 | 0.515 | 0.6208 |
| S | 0.8156 | 0.4848 | 0.6192 |
| S | 0.4806 | 0.8031 | 0.3783 |
| S | 0.5246 | 0.1792 | 0.3762 |
| S | 0.3211 | 0.0034 | 0.8775 |
| S | 0.6757 | 0.9917 | 0.8818 |
| S | 0.9828 | 0.683 | 0.8002 |
| S | 0.0197 | 0.3111 | 0.7997 |
| S | 0.8248 | 0.4895 | 0.2944 |
| S | 0.1746 | 0.5042 | 0.2938 |
| S | 0.5169 | 0.1737 | 0.7038 |
| S | 0.4903 | 0.822 | 0.7039 |
| S | 0.6846 | 0.9652 | 0.1978 |
| S | 0.3148 | 0.0159 | 0.2003 |

The DFT-computed crystal structure for $Na_{10}SnP_2S_{12}$ exhibits the following lattice parameters: a=9.644 angstroms, b=9.691 angstroms, c=13.6 angstroms, α=90.005°, β=90.016°, γ=89.585°. Details pertaining to the calculated relative locations of the elements in the crystal structure are provided in Table IV.

TABLE IV

Theoretical Crystallographic Calculations for $Na_{10}SnP_2S_{12}$

| Element | a | b | c |
|---|---|---|---|
| Na | 0.2388 | 0.2372 | 0.3203 |
| Na | 0.7585 | 0.7588 | 0.3231 |
| Na | 0.2572 | 0.743 | 0.8128 |
| Na | 0.7411 | 0.257 | 0.8216 |

TABLE IV-continued

Theoretical Crystallographic Calculations for $Na_{10}SnP_2S_{12}$

| Element | a | b | c |
|---|---|---|---|
| Na | 0.2522 | 0.7368 | 0.1773 |
| Na | 0.7368 | 0.257 | 0.1812 |
| Na | 0.2361 | 0.2412 | 0.6723 |
| Na | 0.7663 | 0.762 | 0.6736 |
| Na | 0.0081 | 0.5034 | 0.9537 |
| Na | 0.0039 | 0.494 | 0.4577 |
| Na | 0.5105 | 0.0007 | 0.5451 |
| Na | 0.4988 | 0.9997 | 0.0472 |
| Na | 0.2471 | 0.2456 | 0.9969 |
| Na | 0.7507 | 0.7519 | 0.9962 |
| Na | 0.252 | 0.748 | 0.4984 |
| Na | 0.7445 | 0.2591 | 0.4974 |
| Na | 0.9964 | 0.9971 | 0.2484 |
| Na | 0.5018 | 0.5046 | 0.7412 |
| Na | 0.5037 | 0.5027 | 0.2587 |
| Na | 0.9976 | 0.0028 | 0.7549 |
| Ge | 0.9991 | 0.5009 | 0.7057 |
| Ge | 0.4962 | 0.9972 | 0.2949 |
| P | 0.9952 | 0.4966 | 0.2021 |
| P | 0.5002 | 0.0008 | 0.7987 |
| P | 0.9993 | 0.0003 | 0.5019 |
| P | 0.4988 | 0.5011 | 0.0003 |
| S | 0.9944 | 0.173 | 0.4125 |
| S | 0.0032 | 0.8262 | 0.4155 |
| S | 0.3254 | 0.4972 | 0.9112 |
| S | 0.6712 | 0.5067 | 0.9106 |
| S | 0.5058 | 0.6727 | 0.09 |
| S | 0.4908 | 0.3284 | 0.0893 |
| S | 0.1728 | 0.9913 | 0.5905 |
| S | 0.8246 | 0.0137 | 0.5898 |
| S | 0.0043 | 0.321 | 0.1167 |
| S | 0.9846 | 0.6735 | 0.1177 |
| S | 0.2109 | 0.5109 | 0.6091 |
| S | 0.7898 | 0.4951 | 0.6066 |
| S | 0.4937 | 0.7894 | 0.3944 |
| S | 0.5037 | 0.2081 | 0.3912 |
| S | 0.3228 | 0.0053 | 0.8829 |
| S | 0.6766 | 0.9961 | 0.8856 |
| S | 0.9772 | 0.7066 | 0.8085 |
| S | 0.0228 | 0.2966 | 0.8095 |
| S | 0.823 | 0.4825 | 0.2928 |
| S | 0.1703 | 0.5119 | 0.2898 |
| S | 0.5122 | 0.174 | 0.7101 |
| S | 0.4907 | 0.8272 | 0.7099 |
| S | 0.7036 | 0.9776 | 0.1929 |
| S | 0.2905 | 0.0161 | 0.1906 |

Synthesis and Microstructural Analysis of $Na_{10}SnP_2S_{12}$

Figure 2:
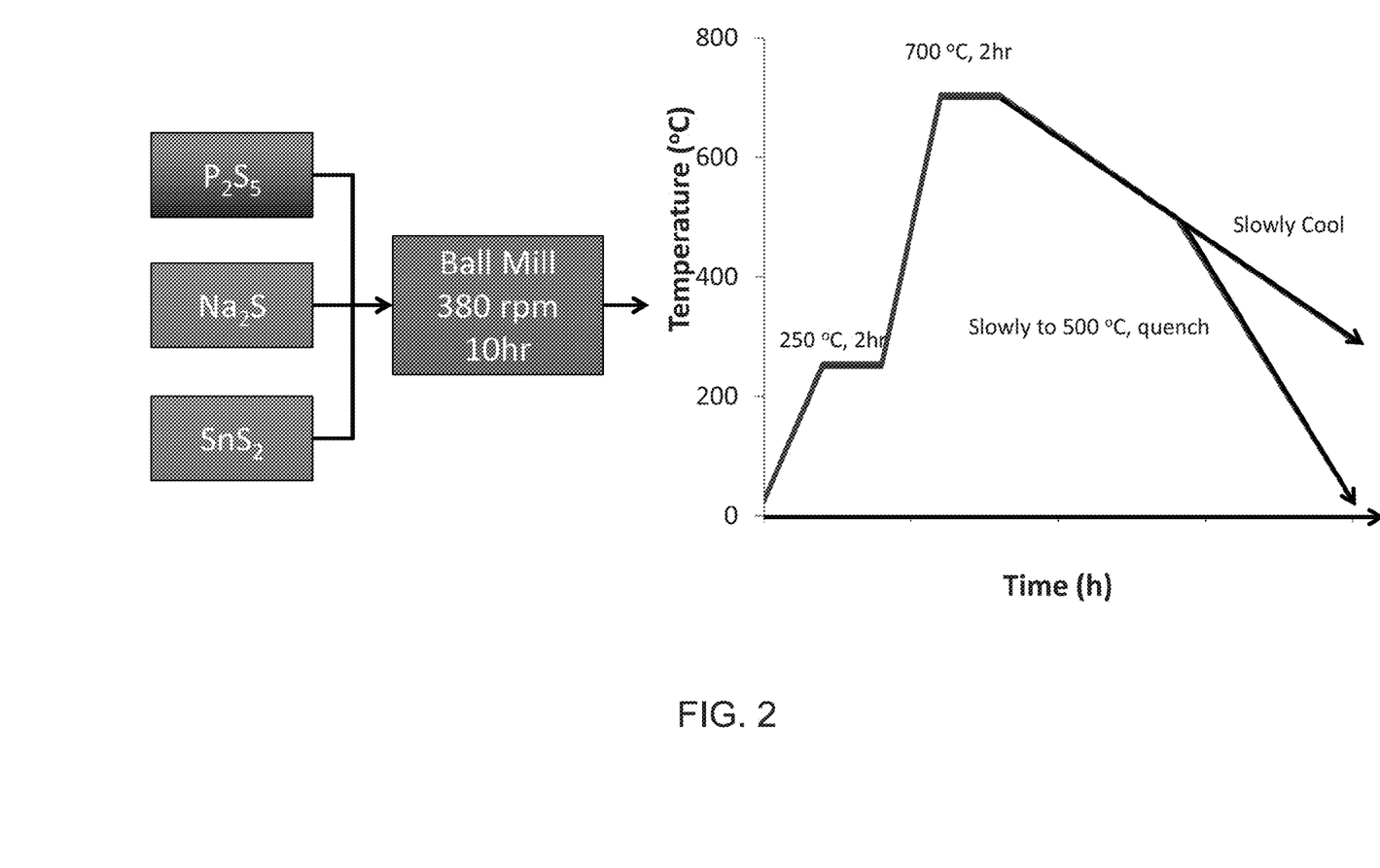
FIG. 2 is a flow chart depicting the synthesis of an exemplary embodiment.

To validate the above-discussed theoretical calculations, synthetic techniques identical or similar to those shown in FIG. 2 are carried out. Initially, samples of $Na_{10}SnP_2S_{12}$ were prepared by combining powder forms of $Na_2S$, $P_2S_5$, and $SnS_2$ in an inert atmosphere (or in vacuum) in appropriate proportions. The powder combinations were then ball milled in an inert atmosphere at 380 revolutions per minute for 16.5 hours to provide a well-mixed and vitrified material composition. The raw material composition was divided into sample portions, each portion wrapped in gold foil, placed in a carbon crucible, and heat treated in an evacuated quartz tube. Each sample was initially heated to 250° C. for two hours, then to 700° C. to form solid-state or liquid solutions. Raw materials and the resulting samples are preferably not exposed to sources of contamination, e.g. water, oxygen, nitrogen, carbon dioxide, etc.

In addition or in the alternative, each sample may be heated to 700° C. for 12 hours, and cooled to room temperature at different rates. Exemplary cooling rates include 1° C./minute (for 12 hours), 5° C./minute ° C. (for 24 hours), 0.2° C./minute (for 48 hours), and 0.1° C./minute (for 99 hours).

While not wishing to be bound by theory, it is believed the sample should be heated to a temperature effective to facilitate elemental diffusion sufficiently quickly to allow a preferred phase of the invention to be formed upon later cooling. Thus, the peak temperature experienced by a sample may render the sample completely or partially liquid in nature. The precise melting temperature of the sample may be determined by differential scanning calorimetry or possibly by other methods.

Figure 3:
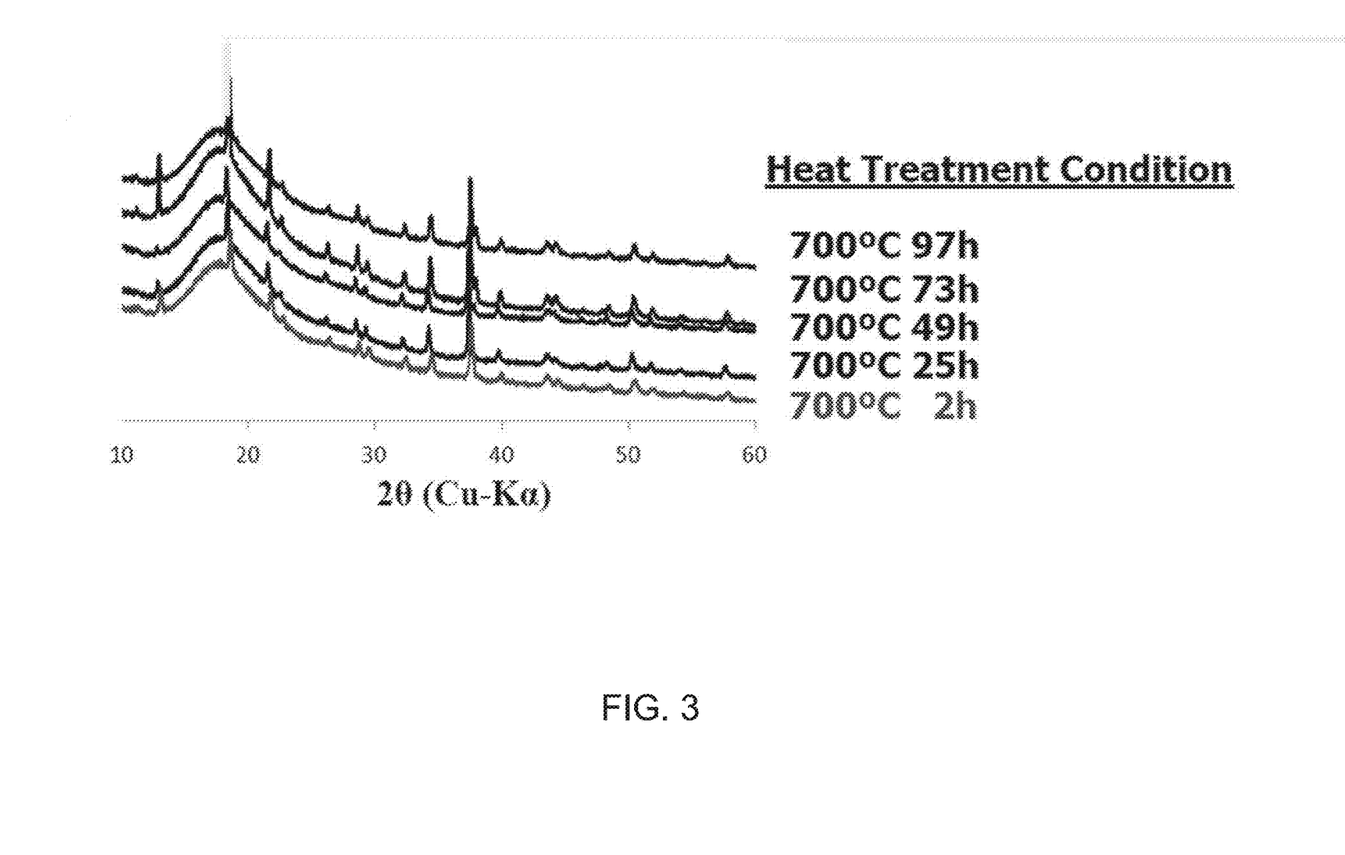
FIG. 3 depicts X-ray diffraction patterns of various samples of under different heat treatments.
Figure 4:
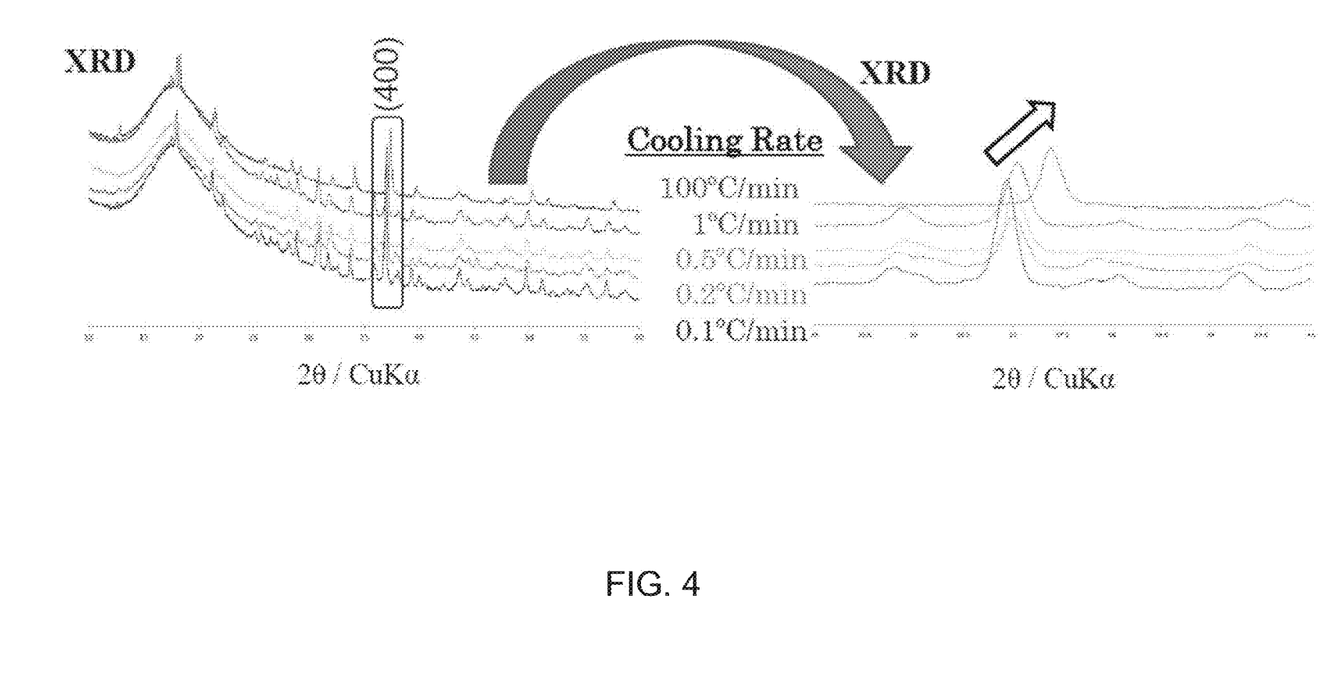
FIG. 4 depicts X-ray diffraction patterns of various samples under different cooling rates.

Then, the samples were cooled at different cooling rates as shown in FIGS. 3 and 4. However, the invention is not limited to these cooling rates. For example, cooling may be carried out more slowly or rapidly (e.g., via quenching rates). In some embodiments, the sample may be slowly cooled to a temperature effective to form a preferred phase of the inventive compound and then quenched to lock in the sample microstructure.

Samples in the examples shown in FIGS. 3 and 4 were experimentally demonstrated to exhibit a skewed P1 structure. When exposed to CuKα radiation, diffraction peaks were formed in positions of within about 0.50° of 2θ=18.18°, 26.74°, 33.88°, 36.90°, 38.07°, 42.59°, and 46.10°, confirming the DFT-computed crystal structure for $Na_{10}SnP_2S_{12}$.

Figure 5:
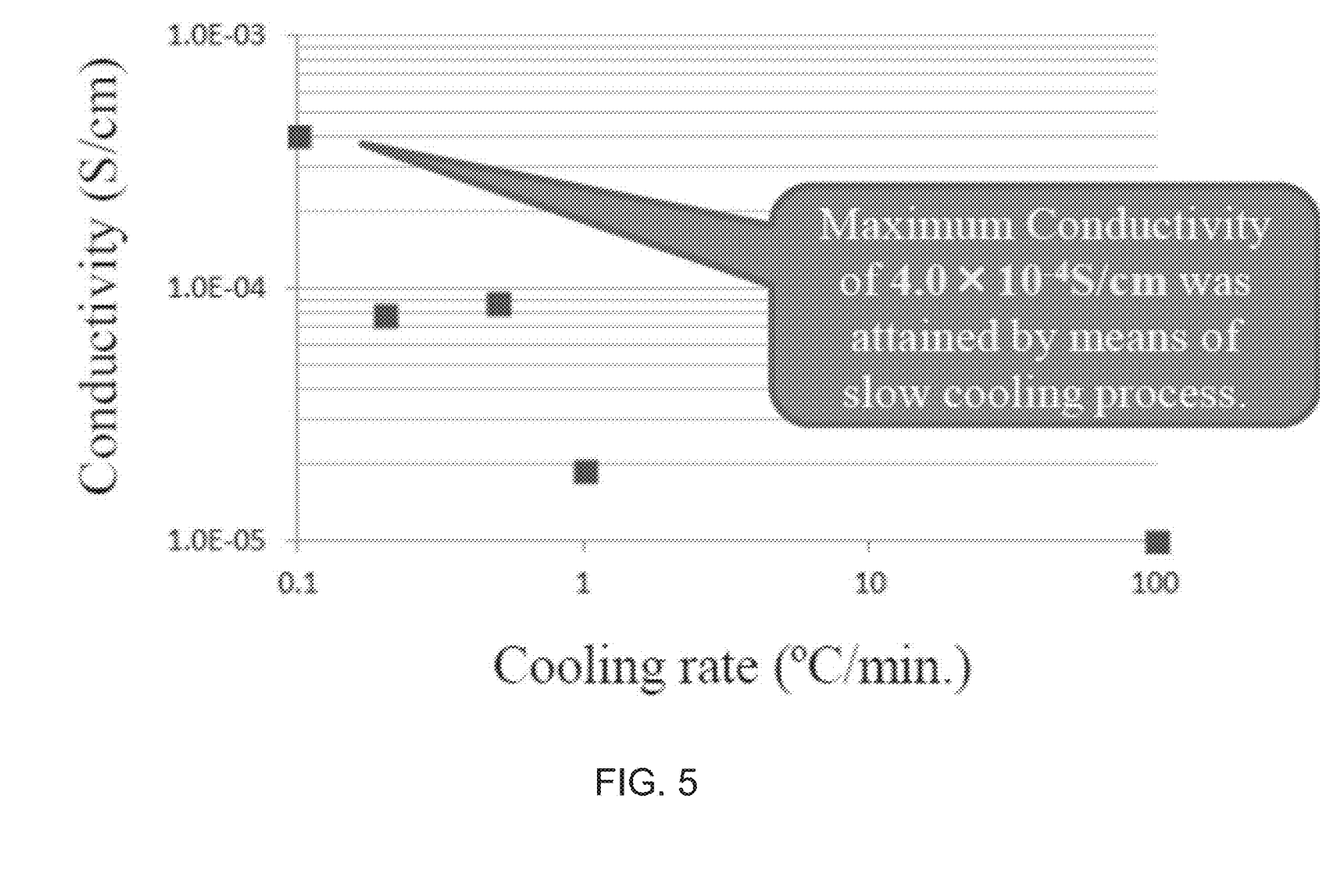
FIG. 5 is a graph that plots the conductivities of samples against their cooling rates.

Notably, a diffraction peak associated with the (400) plane of the unit cell is present at about 36.90°. As suggested in the example of FIG. 4, the diffraction peak generally shifts to the left as the cooling rate is reduced. The conductivity and activation energy of $Na_{10}SnP_2S_{12}$ were measured. As shown in FIG. 5, slowing the cooling rate results in an increase in measured conductivity at 300K. That is, conductivity of the material produced appears to bear a strong inverse correlation to cooling rate experienced by the material during formation. As a result, a cooling rate on the order of no greater about 0.5° C. per minute, preferably no greater than about 0.2° C. per minute, optimally no greater than about 0.1° C. per minute, may be necessary to produce a high-performance material.

Figure 6:
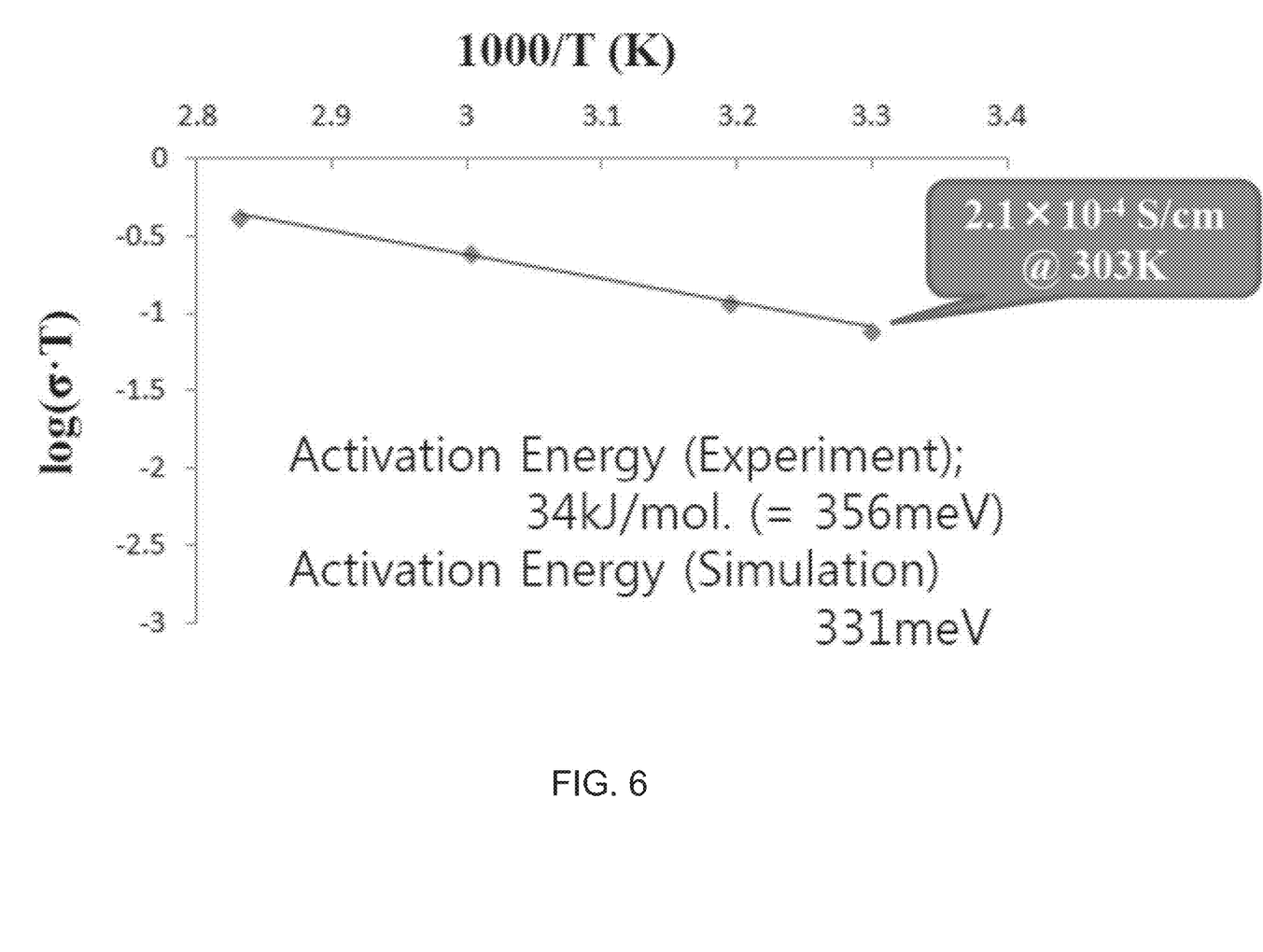
FIG. 6 is a graph that confirms that the measured conductivity and activation energy from experimental results closely matches the predicted values from simulations.

As shown in FIG. 6, the measured conductivity and activation energy of $Na_{10}SnP_2S_{12}$ closely matches the theoretical calculations as discussed above. Thus, the properties of $Na_{10}SiP_2S_{12}$ and $Na_{10}GeP_2S_{12}$, e.g., their crystallographic structure and associated electrochemical behavior, may match those of theoretical calculations as well.

Electrochemical Cell

In another example of an embodiment, an electrochemical cell includes an anode layer containing an anode material, a cathode layer containing a cathode material, and an electrolyte layer between the anode and cathode layers. A solid-state, Na-conductive material, for example the material described in (table X, Fig. Y, or whatever) is present in the cathode layer and/or the electrolyte layer. The cell may, for example, be a rechargeable solid-state cell. One or more cells may be included in the form of a primary or secondary battery, i.e., a single use or rechargeable battery. The battery may take any of a number of shapes, e.g., e.g., a coin shape, a laminate shape, a cylindrical shape and a rectangular shape, etc. The cell may also include an anode current collector in electronic communication with the anode layer and a cathode current collector in electronic communication with the cathode layer Preferably, the electrolyte layer contains the solid-state, Na-conductive material. The electrolyte layer typically includes at least 10% to 100% by volume of the Na-conductive material. The electrolyte layer may have a thickness of about 0.1 μm to 1000 μm. Optionally, the electrolyte layer thickness may range from about 0.1 μm to 300 μm.

The cathode layer may include a cathode material, the solid electrolyte material, an electronically conductive material and a binder. Cathode active materials suitable for a solid-state sodium battery are typically highly Na-conductive and exhibit a relative high voltage against metallic sodium. In contrast, cathode materials may be ionically nonconductive but electronically conductive Microstructurally similar materials used in Li-ion electrochemical cells may be used here. For example, $FeS_2$, $MnO_2$, spinel $NaMn_2O_4$, $NaCoO_2$, $NaNiO_2$ may serve as electroactive cathode materials. Examples of electronically conductive materials for use in the cathode include acetylene black and graphitic materials. The cathode active material layer may also contain a binder. Exemplary binders include fluorine-containing polymers such as polytetrafluoroethylene (PTFE) and polyvinylidene fluoride (PVDF). Examples of current collector materials for the cathode layer include aluminum, nickel, iron, titanium and carbon.

The anode layer includes an anode material and optionally includes the solid electrolyte material, an electronically conductive material, and a binder material. Examples of the anode material include but are not limited to metallic sodium, a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon. The electronically conductive material and a binder used for the anode active material layer may be the same as or similar to those contained in the cathode layer. Exemplary anode current collector materials include copper, nickel and carbon.

Although the examples of embodiments described herein relate to room-temperature solid-state batteries, embodiments may be used in elevated temperature environments, e.g., human body temperature or greater. In addition or in the alternative, the Na-conductive material may be used as an electrolyte-infused separator material interposed between the anode and cathode of a battery, wherein the electrolyte is at least partially liquid or gaseous in nature. Liquid anode and cathode materials may be used as well.

It is to be understood that, while the invention has been described in conjunction with the preferred specific embodiments thereof, the foregoing description merely illustrates and does not limit the scope of the invention. Numerous alternatives and equivalents exist which do not depart from the invention set forth above. For example, there are many different ways to synthesize embodiments of the Na-conductive materials. Alternatives to ball milling such as spray dispersion and other known techniques for mixing starting materials are possible as well. Other aspects, advantages, and modifications within the scope of the invention will be apparent to those skilled in the art to which the invention pertains.

All publications, patent applications, and patents mentioned herein are hereby incorporated by reference in their entireties to an extent consistent with the above disclosure.

We claim:

1. A sodium-conductive solid-state electrolyte material comprising a compound of the composition $Na_{10}MP_2S_{12}$, wherein M is selected from Ge, Si, and Sn.

2. The electrolyte material of claim 1, wherein M is Ge.

3. The electrolyte material of claim 1, wherein M is Si.

4. The electrolyte material of claim 1, wherein M is Sn.

5. The electrolyte material of claim 1, having a conductivity of at least $1.0 \times 10^{-5}$ S/cm at a temperature of 300K.

6. The electrolyte material of claim 5, wherein the conductivity is at least $1.0 \times 10^{-4}$ S/cm at a temperature of 300K.

7. The electrolyte material of claim 1, having a peak in positions of within 0.50° of 2θ=18.18°, 26.74°, 33.88°, 36.90°, 38.07°, 42.59°, and/or 46.10° as measured by X-ray diffraction using CuKα radiation.

8. The electrolyte material of claim 1, having a tetragonal structure.

9. The electrolyte material of claim 8, wherein the tetragonal structure is a skewed P1 structure.

10. The electrolyte material of claim 1, consisting essentially of $Na_{10}MP_2S_{12}$, wherein M is selected from Ge, Si, and Sn.

11. An electrochemical cell comprising:
an anode layer containing an anode material;
a cathode layer containing a cathode material; and
an electrolyte layer between the anode and cathode layers,
wherein a solid-state, Na-conductive material is present in the cathode layer, the electrolyte layer, or both, the material comprising a compound of the composition $Na_{10}MP_2S_{12}$, M being selected from Ge, Si, and Sn.

12. The electrochemical cell of claim 11, wherein the cell is a solid-state cell.

13. The electrochemical cell of claim 11, wherein the cell is rechargeable.

14. A method for producing a sodium-conductive solid electrolyte material, comprising:
forming a raw material composition from elements Na, P, S, and M, wherein element M is selected from Ge, Si, and Sn;
heating the raw material composition to a temperature effective to form a solution; and
cooling the solution at a rate no greater than 1° C. per minute to produce the electrolyte material,
wherein the electrolyte material exhibits an conductivity of at least $1.0 \times 10^{-4}$ S/cm at a temperature at 300K and the method is carried out within no more than 200 hours.

15. The method of claim 14, wherein the plurality of compounds includes $Na_2S$, $P_2S_5$, and $MS_2$, wherein M is selected from Ge, Si, and Sn.

16. The method of claim 14, further comprising heating the raw material composition to a melting temperature before cooling.

17. The method of claim 14, further comprising heating the raw material composition to a peak temperature of at least about 350° C. for at least 2 hours.

18. The method of claim 17, further comprising heating the raw material composition to a peak temperature of at least 550° C.

19. The method of claim 18, further comprising heating the raw material composition to 700° C.

20. The method of claim 14, wherein the solution is cooled at a rate no greater than 0.5° C. per minute.

21. The method of claim 14, wherein the solid-state solution is cooled at a rate no greater than 0.2° C. per minute.

22. The method of claim 14, wherein the solid-state solution is cooled at a rate no greater than 0.1° C. per minute.

* * * * *